May 23, 1939. W. H. BRUSH 2,159,129
VALVE AND MIXING DEVICE
Filed Nov. 22, 1934 2 Sheets-Sheet 2

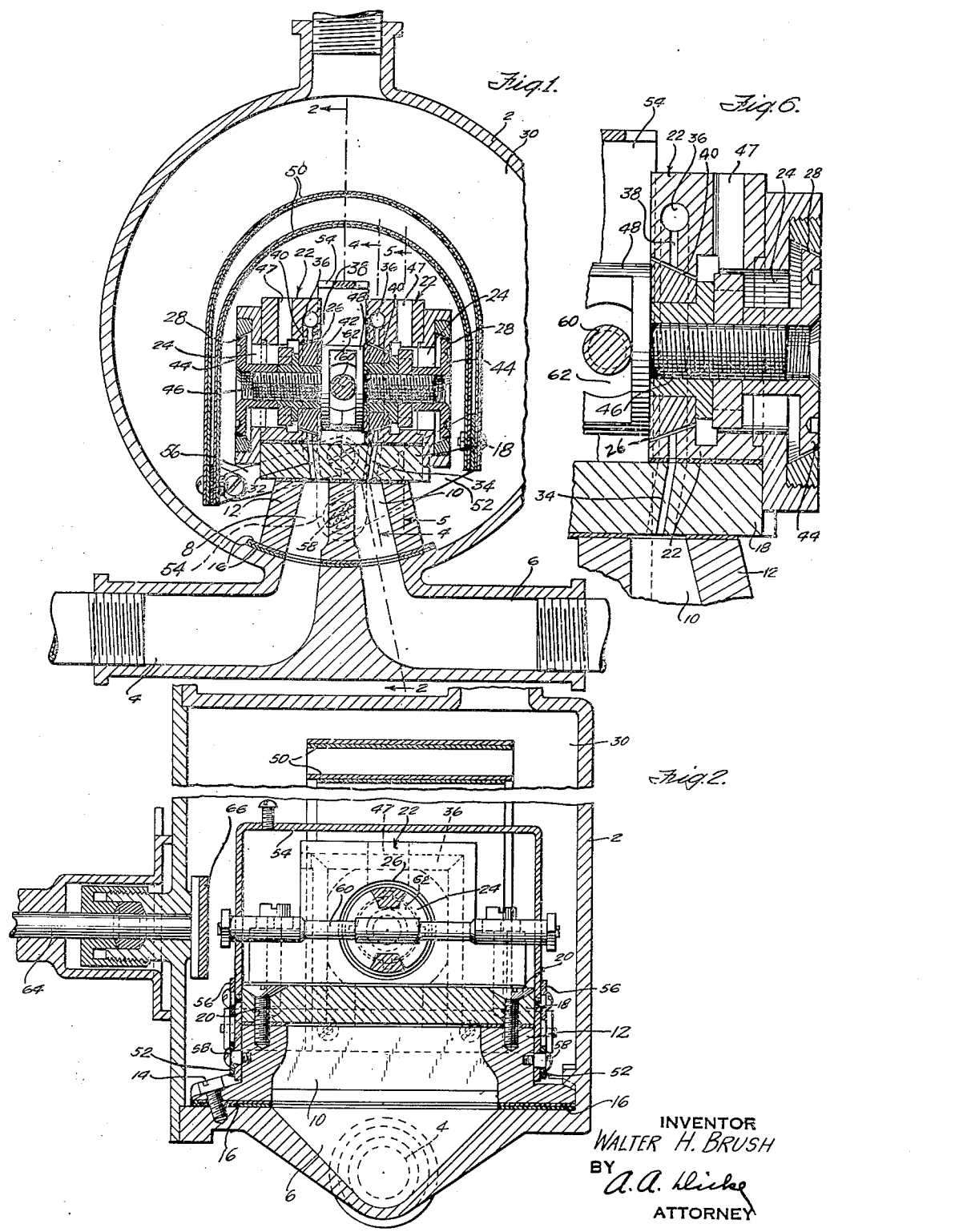

INVENTOR
WALTER H. BRUSH
BY
ATTORNEY

Patented May 23, 1939

2,159,129

UNITED STATES PATENT OFFICE 2,159,129

VALVE AND MIXING DEVICE

Walter H. Brush, Sea Cliff, N. Y., assignor to Thermo-Mix, Inc., a corporation of New York Application November 22, 1934, Serial No. 754,238

10 Claims. (Cl. 236—12)

This invention relates to mixing devices and valves therefor and particularly to constructions adapted for use in mixing fluids.

Mixing devices have been provided heretofore for mixing two fluids, such as hot and cold water, to maintain the temperature of the resulting mixture constant despite changes in temperature of either of the fluids. While such devices are responsive to temperature changes, variations in the velocity of flow of either of the fluids to be mixed tend to cause the valve to fluctuate so that it "hunts" for some time before again reaching a stable condition. The velocity of flow of water passing to the mixing device may occur for any one of a number of reasons as when water is drawn from another outlet in the system so that temperature control alone is frequently insufficient to maintain the desired result. Attempts have been made heretofore to overcome the tendency of the valve to "hunt" by employing a dashpot construction for damping movement of the valve. However, such constructions are objectionable in that they render the valve less sensitive to changes in the condition of the fluids to be mixed.

In accordance with the present invention these difficulties and disadvantages of constructions of the prior art are overcome and a mixing device provided in which the effect of changes in the velocity of flow of fluids passing into the mixing device is eliminated or neutralized so as to avoid the tendency for the valve to fluctuate.

In the preferred construction hereinafter illustrated and described as a typical embodiment of the invention valves controlling the passage of fluids into the device are balanced and any tendency of the valve to be influenced by an increase or decrease in the force exerted by the fluid upon the valve is counteracted by an equal and opposite force. Thus the velocity of flow of the fluid may vary considerably without affecting the operation of the device.

One of the objects of the invention is to provide an improved mixing device responsive to changes in a condition of the fluids and which does not have a tendency to "hunt" upon change in velocity of flow of the fluids being mixed.

Another object of the invention is to provide a novel valve construction in which the elements of the valve are balanced so as to obviate the tendency for the valve to fluctuate with variations in the velocity of flow of the fluid controlled thereby.

Another object of the present invention is to provide a mixing device which is stable and consistent in its operation despite changes in either the temperature or pressure of the fluids supplied to the device.

A further object is to provide a valve having a seat and a port located in said seat.

These and other objects and features of the invention will appear from the following description thereof in which reference is made to the accompanying figures of the drawings illustrating a typical embodiment of mechanism in accordance with the invention.

In the drawings:

Fig. 1 is a vertical sectional view through a mixing device embodying the invention;

Fig. 2 is a vertical sectional view of the construction shown in Fig. 1 taken on the line 2—2;

Figure 3:
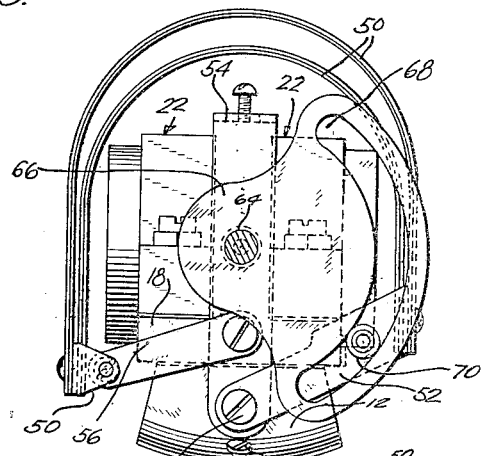
Fig. 3 is an elevation of the construction illustrated in Fig. 1 showing thermo-responsive elements for actuating the valve.
Figure 4:
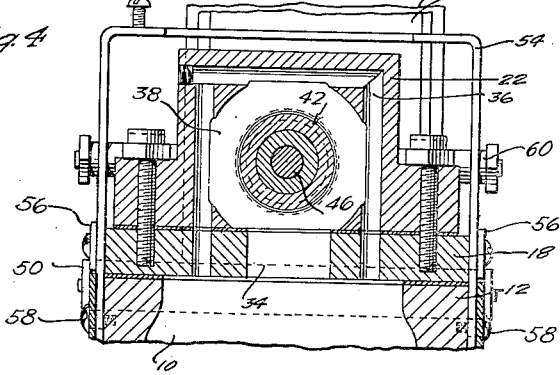
Figure 5:
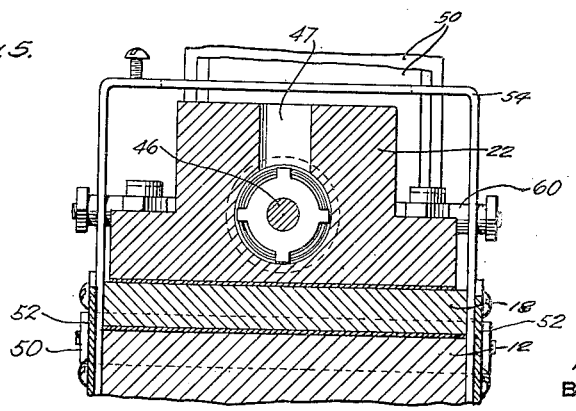

Figs. 4 and 5 are sectional views taken on the lines 4—4 and 5—5 of Fig. 1, respectively; and Fig. 6 is an enlarged view of part of the construction shown in Fig. 1.

In that form of the invention illustrated in the drawings the valve comprises a casing 2 provided with inlets 4 and 6 for hot and cold water respectively or for other fluids to be mixed. The casing 2 may be of any suitable form or construction but, as shown, is cylindrical in shape and of the same general type as that shown and described in the patent to Becker 1,787,304. The inlet passages 4 and 6 are provided with openings in the base of the casing 2 communicating with corresponding openings 8 and 10 in a supporting member 12 on which the valve mechanism is carried. Preferably the member 12 is provided with a circular lower face adapted to bear against the adjacent wall of the casing 2 and to be held in position by means of a screw or the like 14, so that the valve and associated elements of the structure may be readily removed and replaced in the event the elements should require adjustment or repair. Suitable packing 16 may also be provided between the member 12 and the adjacent face of the casing 2 if desired to prevent leakage between the parts.

Valves for controlling the passage of water or other fluid into the mixing space of the valve are associated with each of the passages and since these valves are preferably the same or similar only one will be described in detail. The valves as shown are carried by a plate 18 held in place on the member 12 by means of screws or the like 20. Each valve comprises a member 22 formed with a chamber 24 having two ports 26 and 28 communicating with the mixing space 30 in the interior of the casing 2. A passage 32 or 34 extending from the inlet 4 or 6 through the member 12 communicates with channels 36 extending annularly about one of the ports of the chamber 24. As shown the channels 36 are located adjacent the inwardly facing port 26 and communicate therewith through openings 38. The face 40 of the port is preferably inclined as shown and provides a valve seat completely surrounding each of the openings 38.

In order to control the passage of fluid through the openings 38 and port 26 into the mixing space a valve member 42 is provided which when the valve is closed engages the valve seat 40 and cuts off the flow of fluid through said openings. When the valve is opened and member 42 moved away from the valve seat fluid passes in opposite directions over the face of the valve seat into the mixing space 30 and into the chamber 24 within the member 22.

Fluid passing into the mixing space over the valve member 42 may tend to urge the valve away from its valve seat so as to open the valve further. In order to counteract this tendency the valve is provided with a second valve member 44 closing or partially closing the port 28 facing outwardly from the chamber 24 so that fluid which passes into the chamber from the openings 28 and passed out into the mixing space through the port 28 tends to urge the valve member 44 into closed position. The members 42 and 44 are connected by a rod 46 so that the action of the fluid in tending to open the valve 42 is counteracted by the oppositely applied force tending to close valve 44. In this way the valve members are balanced so that variations in the velocity of flow of the fluid entering the mixing space through openings 38 act equally on the members 42 and 44 and are neutralized. As is best illustrated in Fig. 6, the members 42 and 44 are of slightly different diameter, the diameter of member 44 being slightly larger. This construction is preferably used when, as noted above, the member 44 does not completely close the port 28. Since there will therefore be a leakage through this port at all times, the larger diameter of the closing member is necessary to balance the pressures on members 42 and 44.

Ordinarily it is preferable to form the valve member 42 and its valve seat 40 with engaging faces positioned at a greater angle to the axis of the valve than is provided for the faces of the member 44 and its associated valve seat so that opening of the valve upon like displacement of members 42 and 44 is greater in the case of member 42 than for member 44. The action of the fluid in urging the member 44 closed therefore compensates for the action of the fluid on member 42 even though the velocity pressure of the fluid is applied directly to the member 42. A relief outlet 47 may also be provided to permit ready passage of fluid from the chamber 24 into the mixing space even though member 44 is moved only a short distance from its valve seat and the opening provided is therefore small. This outlet is so positioned that the fluid passing out of it impinges directly upon one of the thermostatic elements 50. A quick response of regulator action is thus insured.

When using the valve construction described above for controlling each of the fluids in a mixing device the valves preferably face in opposite directions and are connected by member 48 so that one valve is opened when the other is closed. Thus the valves are operated simultaneously and accurate control of both fluids is effected with relatively small movement of the valves.

The operation of the valves may be effected by any suitable means but as shown a thermo-responsive element is provided which is placed within the mixing space and is actuated by variations in temperature of the mixed fluids. The form of thermo-responsive element illustrated is similar to that shown and described in the patent to Becker referred to above and comprises bi-metallic members 50 secured at one end to the supporting member 12 by links 52. The free ends of the members 50 are connected to a yoke 54 by links 56 so that movement of the bi-metallic members causes the yoke to be rocked about the pins 58 as pivots. In the present construction these pins 58 also serve to secure the links 52 to the member 12 but this construction, of course, is not essential to the operation of the device.

In order to transmit motion of the bi-metallic member 50 and yoke 54 to the member 48 for actuating the valves a rod 60 is provided which is journalled at its ends in yoke 54 and passes through an opening 62 in shaft 48. In this way movement of the bi-metallic member in one direction moves the yoke and valve members so as to open one of said valves and to close the other whereas movement of said parts in the opposite direction serves to close the first mentioned valve and open the other.

When used for mixing hot and cold water for a shower bath or other purpose the device may be set to maintain any desired temperature by means of a handle (not shown) connected to shaft 64 extending through one face of the casing 2 and provided with a plate 66 formed with a helical slot 68. A pin 70 carried by link 52 extends into the slot 68 so that rotation of the shaft 64 serves to give the yoke and valve members an initial setting corresponding to the temperature of the mixed liquids desired. Thereafter the temperature of the resulting mixture is maintained constant by the action of the thermo-responsive element which operates automatically to open the hot water valve and close the cold water valve or vice versa to maintain the temperature of the mixture constant despite changes in temperature of the water entering from either inlet. Furthermore the temperature of the mixture is maintained constant even though the velocity of flow of the liquid entering through one or both of the inlets is varied. For instance, if when the mixing device is in use, water should be drawn from another outlet in the system the pressure and amount of the water supplied to the mixing device may be decreased considerably so that the hot or cold water or both flow comparatively slowly and at quite different velocities from that at which they previously flowed. However, this change in the velocity of flow of the water and its action upon the valves 42 and 44 does not affect the operation of the valve since this change is applied equally and in opposite directions to the elements of the valves. On the other hand when the temperature of the water in the mixing space is altered by a change in the supply of hot water the valve immediately acts under the operation of the thermo-responsive element to close the cold water valve and open the hot water valve or vice versa until the desired temperature is restored.

In that form of the invention herein illustrated and described the device is disclosed as applied to a mixing device actuated by a thermal responsive element. However, it will be apparent that pressure responsive means or manually operated means may be employed in place of the thermal responsive element for actuating the valves. It will also be apparent that certain features of the invention are not limited to their application to mixing devices but may be employed in various other relations for controlling the flow of other fluids. In view thereof it should be understood that the form of the invention set forth above has been described for the purposes of illustration of a typical embodiment thereof and is not intended to limit the scope of the invention.

What is claimed is:

1. A valve structure comprising a valve seat presenting an inclined surface, a valve movable into and out of engagement with said valve seat, the inclined surface of said seat being formed with an opening in that portion thereof which is engaged by said valve, and means associated with said valve serving to balance the force exerted upon said valve by fluid passing through through said opening.

2. A valve having a chamber provided with oppositely located main and auxiliary outlet ports, a valve for controlling each port, and means for connecting said valves together for simultaneous operation in the same direction, said valves being arranged so as to entirely close said main port but not said auxiliary port.

3. The combination according to claim 2 in which the auxiliary valve and corresponding port which it is adapted to close has a larger diameter than the main valve and port.

4. A valve structure comprising an inlet port and two outlet ports, a pair of interconnected valves cooperating respectively with each of said outlet ports, only one of said outlet ports being adapted to be entirely closed by its associated valve.

5. A mixing device comprising a mixing chamber an inlet for each of the fluids to be mixed, means for controlling the passage through each of said inlets comprising oppositely arranged pairs of valves, one of which pairs is associated with each inlet, one valve only of each pair being movable to close the inlet with which it is associated and the other located so as to be acted upon by the fluid passing from said inlet when the first valve is moved from its valve seat whereby variations in the force exerted by said fluid upon one of said valves is balanced by the force exerted upon the other.

6. In a mixing valve having a mixing chamber and thermostatic valve controlling means therein, the combination of a valve structure having an inlet port, an outlet port, a controlling valve for the same, and an auxiliary outlet port so positioned that the fluid flowing therefrom impinges upon the themostatic valve control means, whereby a relatively quick action of the valve controlling means is obtained.

7. In a mixing valve, in combination, an inlet adapted to receive relatively hot fluid, an inlet adapted to receive relatively cold fluid, a mixing chamber, an outlet from said mixing chamber, a valve seat having an inclined engaging surface and an interior conduit communicating with the face of said inclined engaging surface and one of said inlets, a valve disc adapted to engage said inclined engaging surface for controlling the flow of fluid through said conduit, and means operatively connected to said valve disc for controlling the other of said inlets.

8. In a mixing valve, in combination, an inlet adapted to receive relatively hot fluid, an inlet adapted to receive relatively cold fluid, a mixing chamber, an outlet from said mixing chamber, a valve seat having an inclined engaging surface and an interior conduit communicating with the face of said inclined engaging surface and one of said inlets, a valve disc adapted to engage said inclined engaging surface for controlling the flow of fluid through said conduit, and separate means permitting communication of the other inlet with said mixing chamber.

9. In a mixing device for controllably mixing two fluids of different temperatures, in combination, an inlet for each fluid, two sub-chambers, one connected to each inlet, an identical opposed pair of valves for controlling the flow of fluid to and from each of said sub-chambers, and a mixing chamber surrounding said valves and sub-chambers, whereby the valves of each pair are subjected to equal and opposite pressures from the fluid within the sub-chambers, and the valves of both pairs are subjected to the equalizing pressure of the fluid within the mixing chamber.

10. The combination according to claim 9, in combination with a thermostatic element for automatically controlling said valves, positioned within said mixing chamber, each of said sub-chambers having openings directed toward said thermostatic element, whereby a quick response of said element to the temperature of both of the fluids to be mixed is insured.

WALTER H. BRUSH.